March 14, 1939.  C. S. BROWN  2,150,359
AUTOMATIC SEWER REGULATOR
Filed May 28, 1938  2 Sheets-Sheet 1

Inventor
Chalmers S. Brown
By Faust Frampton
Attorney

March 14, 1939.  C. S. BROWN  2,150,359
AUTOMATIC SEWER REGULATOR
Filed May 28, 1938  2 Sheets-Sheet 2

Inventor
Chalmers S. Brown
By [signature]
Attorney

Patented Mar. 14, 1939

2,150,359

UNITED STATES PATENT OFFICE 2,150,359

AUTOMATIC SEWER REGULATOR

Chalmers S. Brown, Lima, Ohio

Application May 28, 1938, Serial No. 210,641

2 Claims. (Cl. 137—78)

My invention relates to regulators for limiting the quantity flow of water to parts of sewer systems. The invention may be used for preventing the flow of storm water into a pipe that leads to an interceptor, which in turn controls the rate of flow of sewage water to sewage treatment plants, or the invention may be used for controlling flow of water to parts of a sewer system to equalize the load on the system.

As is well known in the art, sewer regulators are provided with valves which are normally maintained open to permit the outflow of water to interceptors or other parts of sewer systems and which are closed by the rise of the level of the water to direct the water on through the sewer. This commonly occurs upon excess precipitation of water or melting of snow. The valves are operated by floats that ride the combined flow of sewer water and the storm water and are located in float chambers to which the water is directed from the stream. This results in the deposition of sewage in the float chambers that necessitates periodic hosing to remove the sewage.

By my invention, I have provided a means for directing the excess or storm water into the float chamber to operate the valve when, and only when, there is an abnormal flow, and thereby reduce the quantity of sewage deposited in the float chamber.

The invention may be contained in automatic sewer regulators of different forms and to illustrate a practical application of the invention, I have selected a regulator for controlling the flow of water in sewers and shall describe the selected structure hereinafter. The sewer regulator selected is shown in the accompanying drawings.

Figure 1:
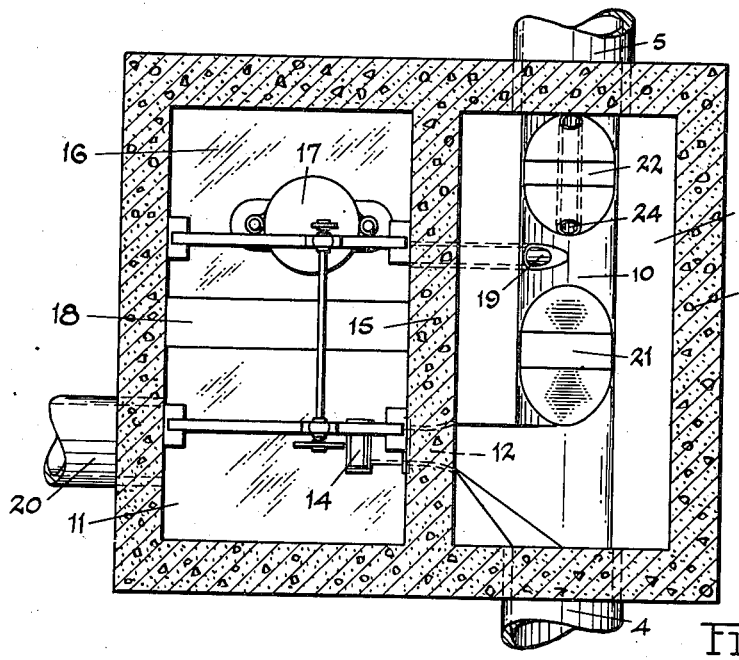
Figure 2:
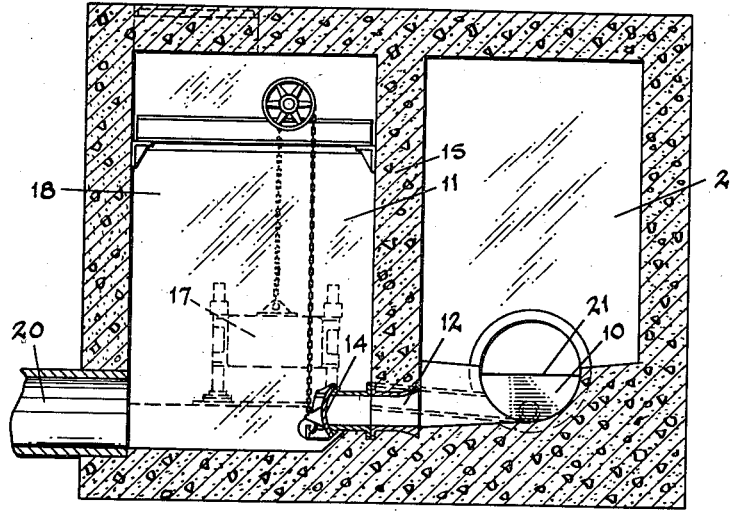
Figure 3:
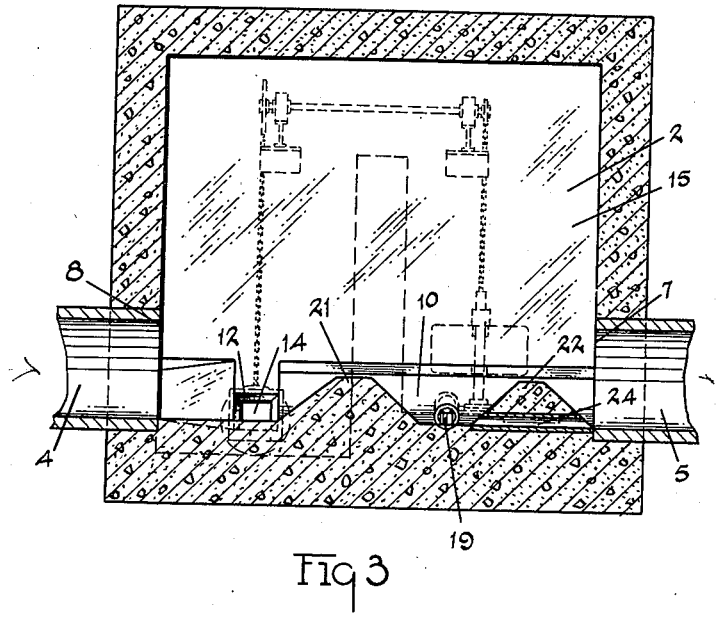

Fig. 1 illustrates a horizontal section of the regulator. Fig. 2 illustrates a vertical section of the structure shown in Fig. 1. Fig. 3 illustrates a vertical section taken on a plane extending at right angles to the plane of the section shown in Fig. 2.

The regulator 1 is provided with a sewer water receiving chamber 2, which is connected to the sewer pipes 4 and 5. The pipe 4 is connected to an inlet 8 of the chamber 2, and the pipe 5 is connected to the outlet 7 of the chamber. The bottom of the chamber 2 has a semi-cylindrical recess or channel 10 forming a passageway for the combined flow of storm and dry weather water through the chamber.

The regulator is also provided with a valve chamber 11 and a float chamber 16, which is separated from the valve chamber 11 by the wall 18. A wall 15 separates the valve chamber and the float chamber from the chamber 2. The chamber 2 has an outlet 12 and a valve 14, mounted on the wall 15. The valve is operated by means of a float 17 located in the float chamber 16 to control the flow of water through the outlet 12. A passageway extends from the bottom of the channel 10 to the float chamber 16 and forms an inlet 19 for directing water into the float chamber. A pipe 20 is connected to the chamber 11 and forms an outlet for conducting sanitary or dry weather flow to another part of the sewer.

The structure is such that the valve 14 is normally retained open to permit flow of water through the pipe 20. When there is a combined flow of water, the level of the liquid in the float chamber rises, and the valve 12 is closed. During normal or dry weather flow there is a substantially continuous flow into the pipe 20.

A weir 21 is located in the channel 10 and is disposed intermediate the inlet 19 and the sewer outlet for normally intercepting the dry weather flow which is directed to the chamber 11 through the valve controlled outlet 12 and prevent entrance of the dry weather flow into the float chamber 16. This reduces the amount of sewage that would otherwise collect in the float chamber and eliminate the frequent washings required to remove the sewage from the float chamber.

In order to produce a rapid rise of the level of the water in the float chamber and produce a prompt responsive action of the float and the valve controlled thereby upon an abnormal flow of water, a second weir 22 may be located in the channel 10. The two weirs form a pool intermediate the weirs upon combined flow. The storm water that flows into the sewer greatly dilutes the sewage, and the sewage is washed through the sewer. The weirs that form the pool operate to quickly establish sufficient water in the float chamber 16 to produce a counterbalancing of the weights of the float and valve 12 by floatation of the float. This occurs when the level of the water reaches the crests of the weirs. Any further rise of the level of the liquid in the float chamber will immediately cause the float to move the valve 14 toward its closed position to restrict the outflow through the outlet 12. The temporary retention of the water in the regulator renders the valve and float responsive to any sudden influx of water that may enter the receiver chamber 2 and enables immediate closure of the valve to prevent excess flow of storm water to a treatment plant.

A small weep pipe or drain pipe 24 is located at the base of the weir 22 that drains the water from the pool and the float chamber upon restoration of normal conditions to greatly reduce deposition of sewage in the float chamber and the pool. The weep pipe, however, is of a size that will retard the outward combined flow sufficiently to raise the level of the water between the weirs and in the float chamber upon sudden influx of water.

I claim:

1. In a sewer regulator, the regulator having a sewer passageway, a sewer inlet and a sewer outlet, a float chamber, a float located in the float chamber, a dry-weather water outlet, a valve operated by the float for controlling the dry-weather water outlet, means for producing a pool of water in the regulator sewer passageway during excess flow of water in the sewer, means for directing the water from the pool into the float chamber for initiating the closing movement of the valve, and means for draining the pool as the flow of the sewer water becomes normal.

2. In a sewer regulator, the regulator having a sewer passageway, a sewer inlet and a sewer outlet, a float chamber, a float located in the float chamber, a dry-weather water outlet, a valve operated by the float for controlling the dry-weather water outlet according to the level of the liquid in the float chamber, a float chamber inlet connecting the float chamber with the sewer passageway, a weir disposed intermediate the float chamber inlet and the dry-weather water outlet, and a second weir disposed intermediate the float chamber inlet and the sewer outlet for raising the level of the water in the float chamber immediately upon abnormal flow of the sewer water, the said second weir having a weep-pipe for the outflow of water from between the said weirs.

CHALMERS S. BROWN.